United States Patent
Kendall et al.

[15] 3,677,507
[45] July 18, 1972

[54] TACTICAL CARGO HOOK

[72] Inventors: Giles Arthur Kendall, Tarzana; Robert Minick, Glendale, both of Calif.

[73] Assignee: Menasco Manufacturing Company, Burbank, Calif.

[22] Filed: July 23, 1970

[21] Appl. No.: 63,993

Related U.S. Application Data

[62] Division of Ser. No. 718,531, April 3, 1968, Pat. No. 3,608,948.

[52] U.S. Cl. ........................................................... 244/137
[51] Int. Cl. ........................................................... B64c 1/22
[58] Field of Search ............... 244/137 R, 135 A; 294/78, 83, 294/82

[56] References Cited

UNITED STATES PATENTS

| | | | |
|---|---|---|---|
| 2,793,828 | 5/1957 | Rothert | 244/135 A |
| 3,046,598 | 7/1962 | Daugherty | 294/83 X |
| 3,179,461 | 4/1965 | Rose et al. | 294/83 |
| 3,202,446 | 8/1965 | Long | 294/82 |
| 3,227,401 | 1/1966 | Currier | 244/137 R |
| 3,601,342 | 8/1971 | Piasecki | 244/137 R |

Primary Examiner—Trygve M. Blix
Attorney—Elwood S. Kendrick, Thomas H. Jones and Kendrick and Subkow

[57] ABSTRACT

A cargo hook system having a drogue which may be supported on the nose of a helicopter; a cargo hook assembly and a probe supported from the cargo hook assembly, said cargo hook assembly having a hook movable from an open to a closed position, and means to maintain the hook in an unloaded condition in a direction facing toward the probe, means to position the hook in any desired direction when supporting a load, means to open and close the hook, means to lock the hook in its closed position when loaded, and latch means to prevent removal of a load from said hook in its closed position; support means for the cargo hook assembly which may be connected to a helicopter at or near its center of mass; and means to guide the probe into the drogue, to maintain the probe in the drogue when the cargo hook assembly is not in use, and to release the probe from the drogue when the cargo hook assembly is in use. A cargo hook assembly having a support housing; a hook supported by the housing and being rotatable with respect thereto; the hook having an open and a closed position; means to open and close the hook; means to lock the hook in its closed position when supporting a load; means to bias the rotational direction of the hook to a predetermined position with respect to the support housing; means to position the hook in any desired rotational direction with respect to the support housing when supporting a load; and a latch means to prevent removal of a load from the hook in its closed position. A pick-up adaptor having a plurality of frame members connected pivotally in a sequential end-to-end relation; the end-most frame members connected to load support means; means biasing the frame members to maintain the unloaded adaptor in a collapsed condition in which one of the frame members having a curved and a straight portion has its straight portion in a substantially horizontal position to provide a target area for the engagement of a hook; the frame members forming an inverted V-frame structure when the adaptor is loaded, the load being supported by a hook which engages the horizontal straight portion of the said frame member having a curved portion, the hook sliding upwardly to the curved portion of the member as the adaptor forms an erect inverted V-frame structure under load conditions.

6 Claims, 14 Drawing Figures

Patented July 18, 1972

INVENTORS.
GILES A. KENDALL
ROBERT MINICK
BY KENDRICK and SUBKOW
ATTORNEY

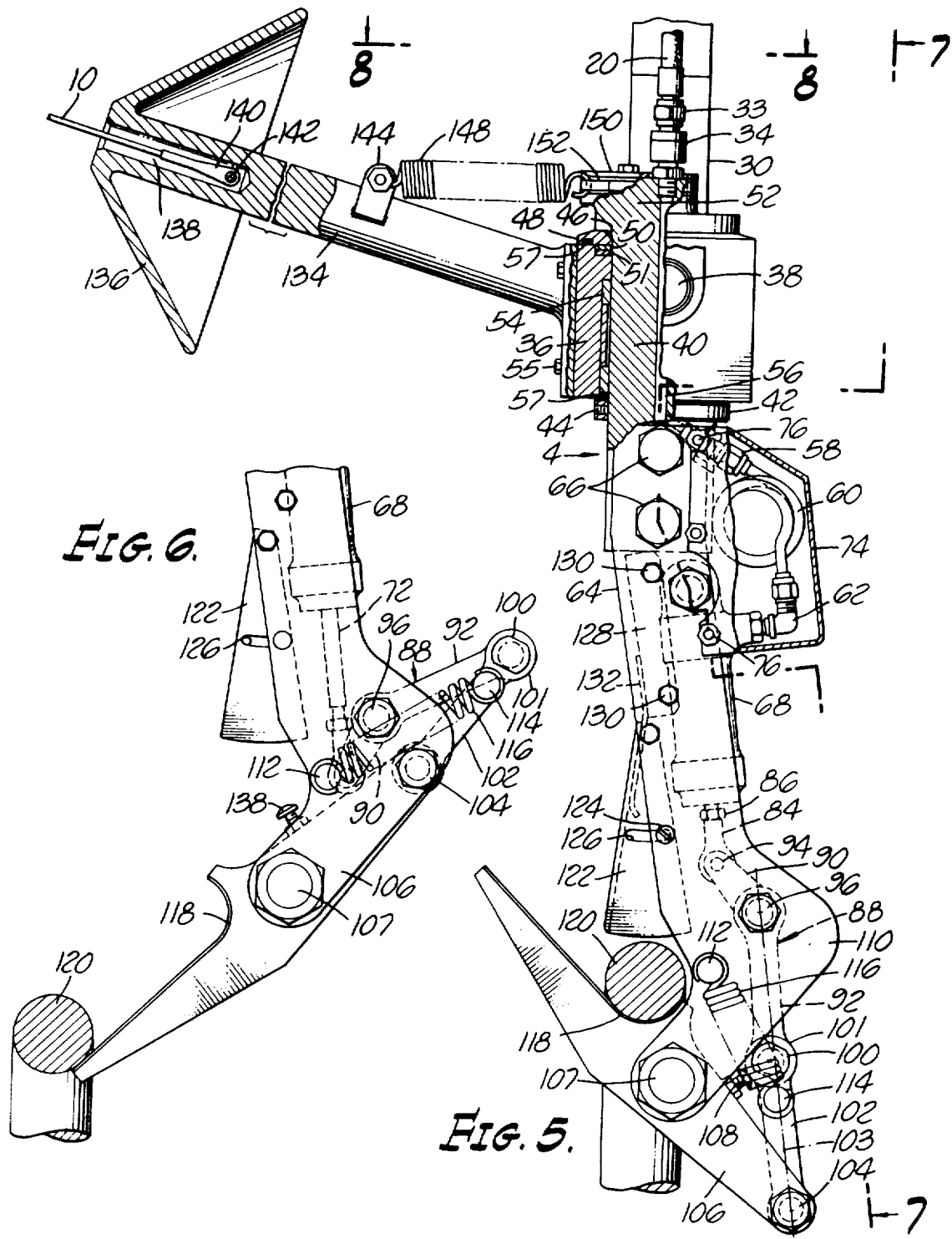

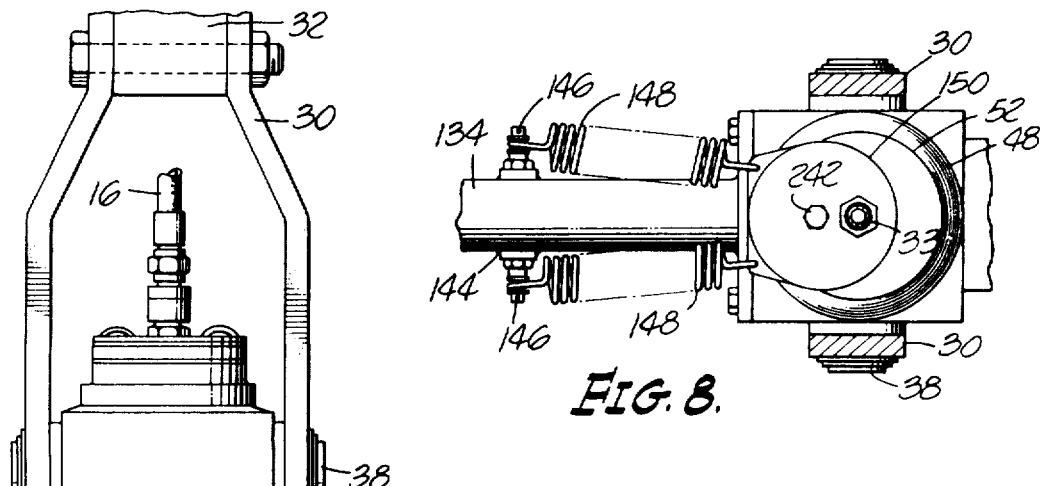
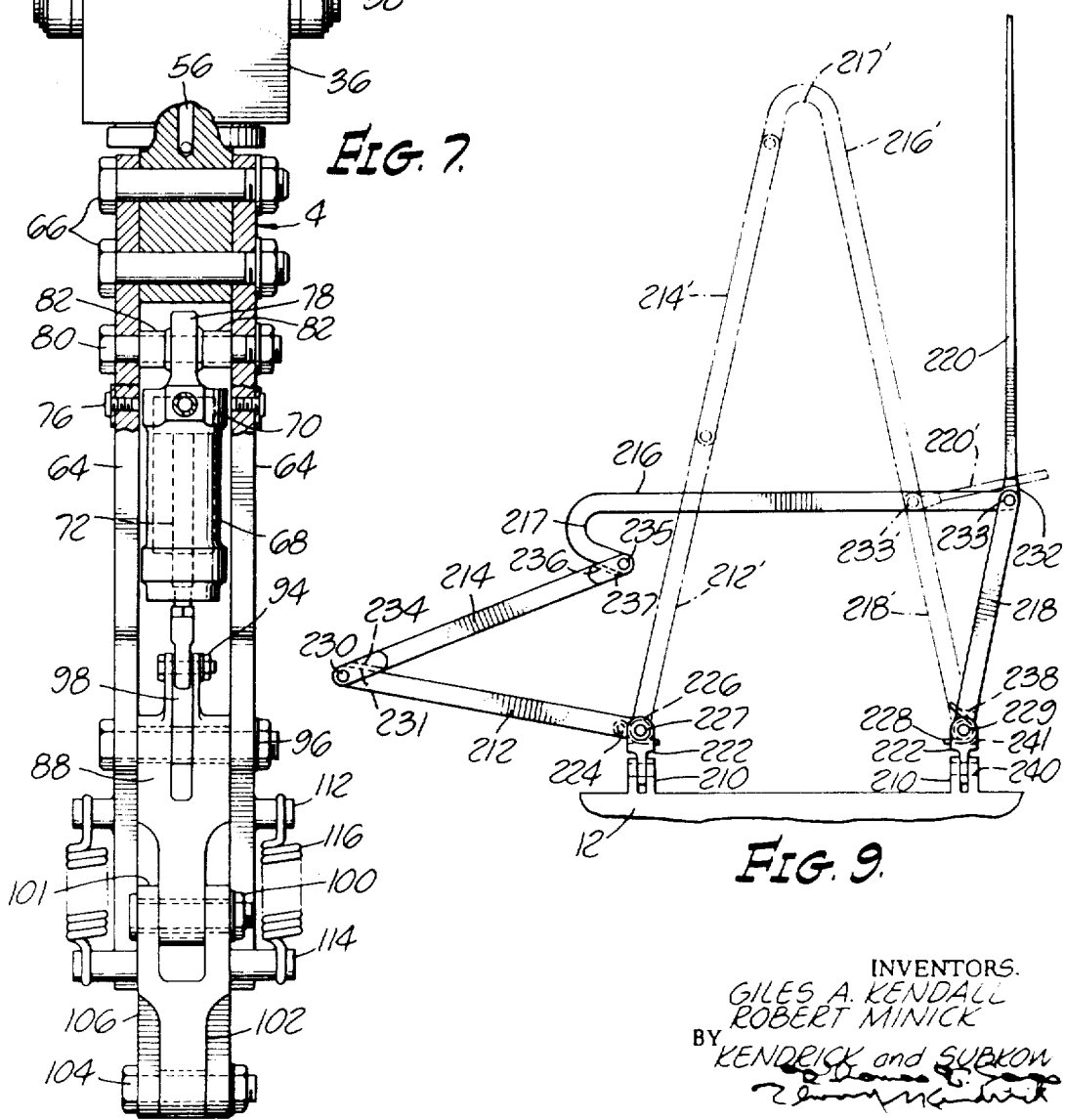

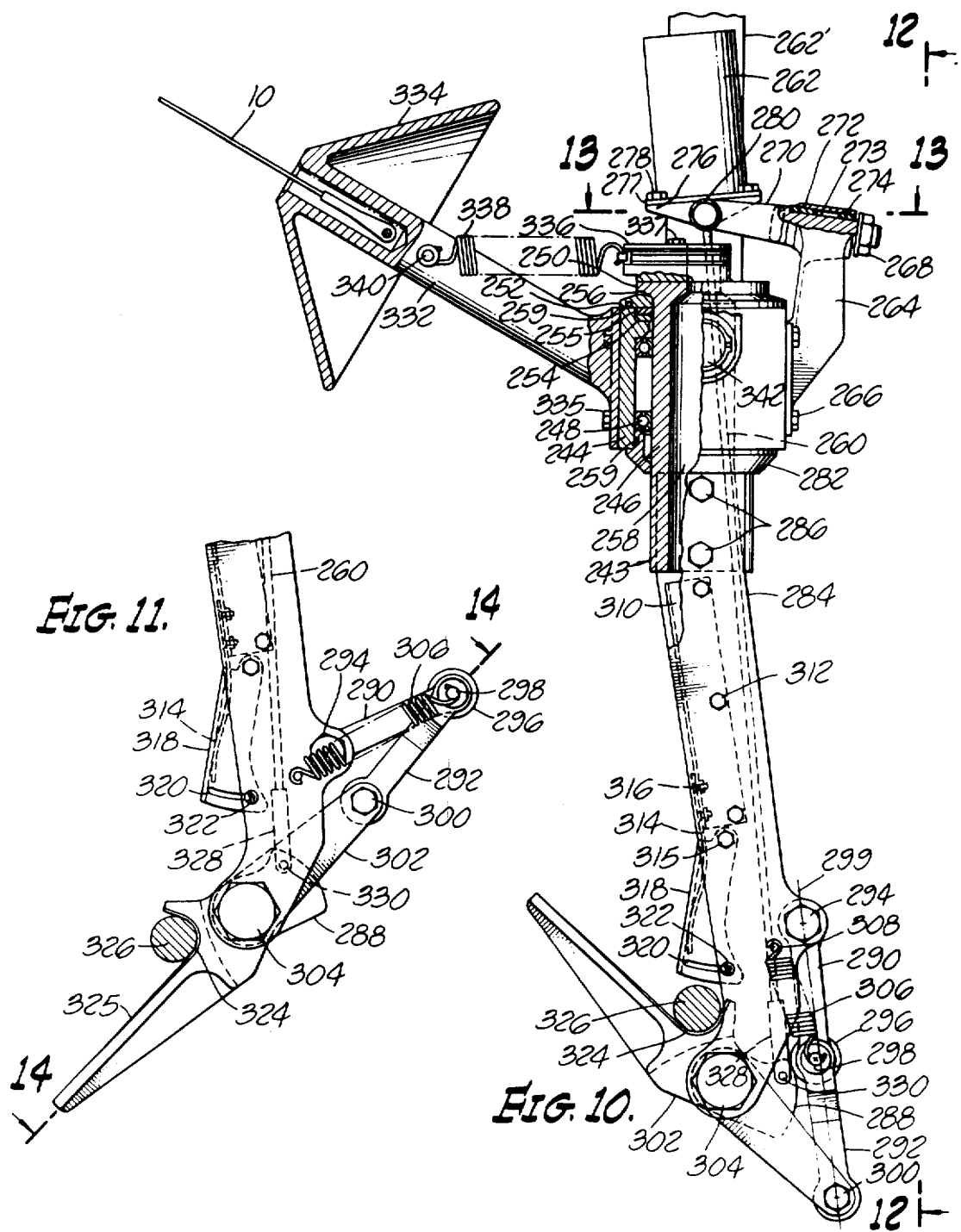

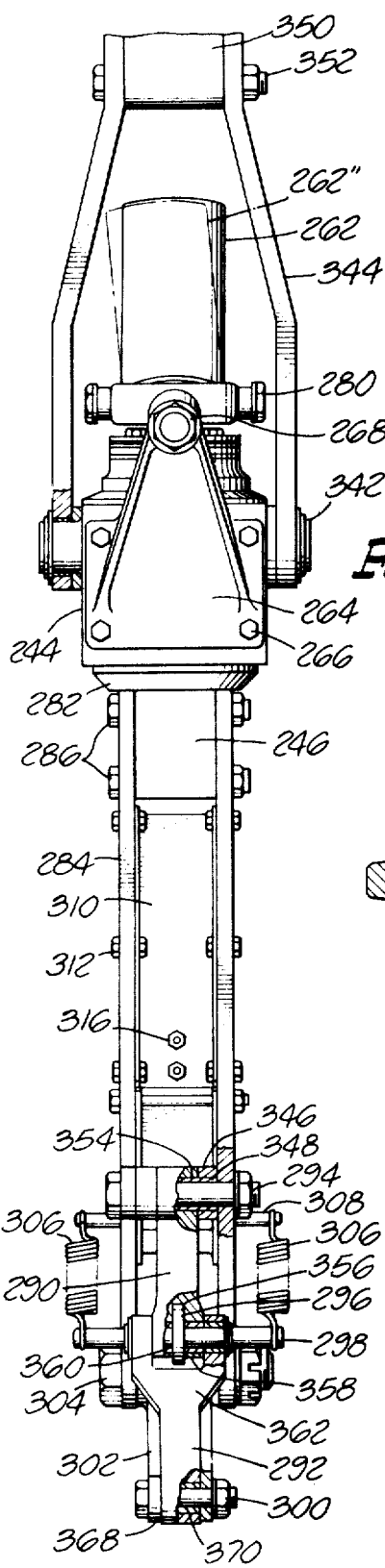
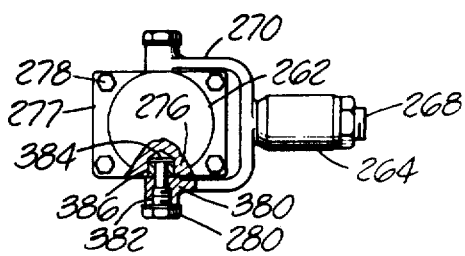
FIG. 13.
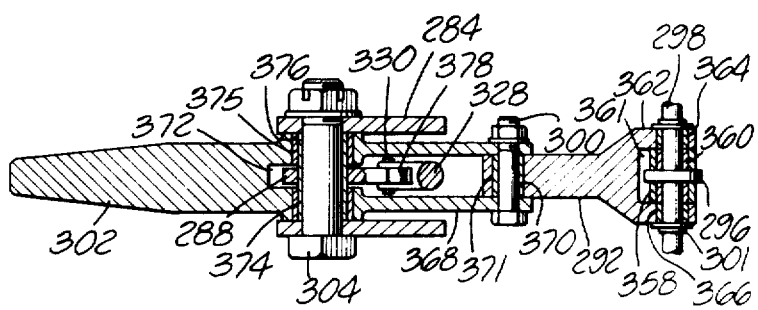
FIG. 14.
FIG. 12.
INVENTORS.
GILES A. KENDALL
ROBERT MINICK
BY KENDRICK and SUBKOW
ATTORNEY

TACTICAL CARGO HOOK

This application is a division of application Ser. No. 718,531 filed Apr. 3, 1968 and now U.S. Pat. No. 3,608,948.

This invention pertains to a flight engagement tactical cargo hook system. The invention also pertains to a tactical cargo hook assembly which may be supported by a helicopter or similar device and is adapted to pick up or deposit cargo on the ground while the helicopter is in flight.

In modern warfare, it is frequently necessary to move both men and materials rapidly from one point to another. This is especially true in the case of guerilla warfare where an enemy may attack at one point on a given day and attack at a point many miles distant on a succeeding day. By being able to move both men and materials rapidly from one point to another, a field commander faced with attack from guerilla forces can concentrate his resources at points of greatest need and thereby maintain superiority of men and materials over the enemy.

The work horse of modern warfare in providing mobility for troops and supplies is the helicopter. Since a helicopter does not require a runway for landing or take off, it can both pick up and drop men and supplies on terrain which would otherwise be inaccessible. During the pick up or drop of supplies, the helicopter must remain relatively stationary and, therefore, vulnerable. Moreover, during the pick up or dropping of supplies, the men on the ground working with the helicopter pilot may also be in a very vulnerable position where they are exposed to enemy ground fire.

At the present time, heavy cargo, such as guns, or ammunition, may be moved by suspending it beneath a helicopter by means of a cable. In loading heavy cargo beneath a helicopter on a cable, it is presently necessary for the helicopter to either land or remain stationary in a hovering position for an extended time period while men on the ground secure the heavy cargo to the cable. Similarly, in unloading heavy cargo from a cable suspended beneath a helicopter, it is necessary for the helicopter to land or to hover while men on the ground release the cargo from the cable. At best, it takes at least 30 seconds to load or unload heavy cargo in this manner and, a longer time, such as 1 minute or more, is generally required for loading or unloading. During this time interval, both the helicopter and the men working on the ground may be exposed to enemy ground fire.

In accord with the present invention, we have provided a tactical cargo hook system by means of which cargo can be loaded or unloaded in a matter of seconds from a helicopter in flight. Our system does not require the presence of men working on the ground to manually assist the helicopter pilot during the loading or unloading operation. In accord with our system, both loading and unloading may be controlled entirely from the helicopter. Thus, for example, by employing our system a helicopter can deposit or pick up cargo without exposing ground forces to fire and without requiring that the helicopter pilot expose his craft to unnecessary risk by hovering for a prolonged period during loading or unloading.

In summarizing our invention, it pertains to a tactical cargo hook system, a cargo hook assembly, and a universal pick up adaptor which may advantageously be employed with our cargo hook system or our cargo hook assembly. Our cargo hook system includes a drogue which may be conveniently positioned at or adjacent the nose portion of a helicopter, a cargo hook assembly which is conveniently supported from a point at or near the center of mass of the helicopter, a probe connected to the cargo hook assembly, and means to guide the probe into the drogue, to maintain the probe in the drogue when the cargo hook assembly is not in use, and to release the probe from the drogue when the cargo hook assembly is in use.

The cargo hook assembly includes a housing, a hook, means for rotatably supporting the hook with respect to the housing, means for moving the hook from an open to a closed position and may include means for biasing the hook in a predetermined rotational direction with respect to the housing as well as means to releasably lock the hook in a closed position when it is in a loaded condition.

The universal pick-up adaptor of our invention has a collapsed configuration when unloaded and an erect configuration under load. It is composed of a plurality of frame members which are pivotally connected in a sequential end-to-end relation. The endmost frame members are connected to a load support means and at least one of the frame members has a straight portion and a curved portion, the straight portion occupying a substantially horizontal position in space when the adaptor is in its collapsed position to provide a target area for engagement of a hook. As a hook engages the substantially horizontal straight portion, the adaptor is placed under load and assumes its erect configuration with the hook sliding from the straight portion of the frame member with which it makes initial contact to its curved portion.

A specific embodiment of the invention is illustrated in the accompanying drawings in which like reference characters designate like parts of the several views thereof, wherein:

FIG. 5 is a side view in partial section of the cargo hook assembly and probe with the hook in closed position;

FIG. 6 is a side detail view of the lower end portion of the cargo hook assembly of FIG. 5 with the hook in open position;

FIG. 7 is an end view in partial section of the cargo hook assembly of FIG. 5 taken along the lines 7—7 of FIG. 5;

FIG. 8 is a top view in partial section of the cargo hook assembly of FIG. 5 taken along lines 8—8 of FIG. 5;

FIG. 9 is a front view of a universal pick-up support in both its erect and collapsed positions;

FIG. 10 is a side view in partial section of a further embodiment of a cargo hook assembly of our invention with the hook in its closed position;

FIG. 11 is a side detail view of the lower end portion of the cargo hook assembly of FIG. 10 with the hook in its open position;

FIG. 12 is an end view in partial section of the cargo hook of FIG. 10 taken along the lines 12—13 of FIG. 10;

FIG. 13 is a top view in partial section of the cargo hook of FIG. 10 taken along the lines 13—13 of FIG. 10, and FIG. 14 is a sectional view of the cargo hook of FIG. 10 as taken along the lines 14—14 of FIG. 11.

Figure 1:
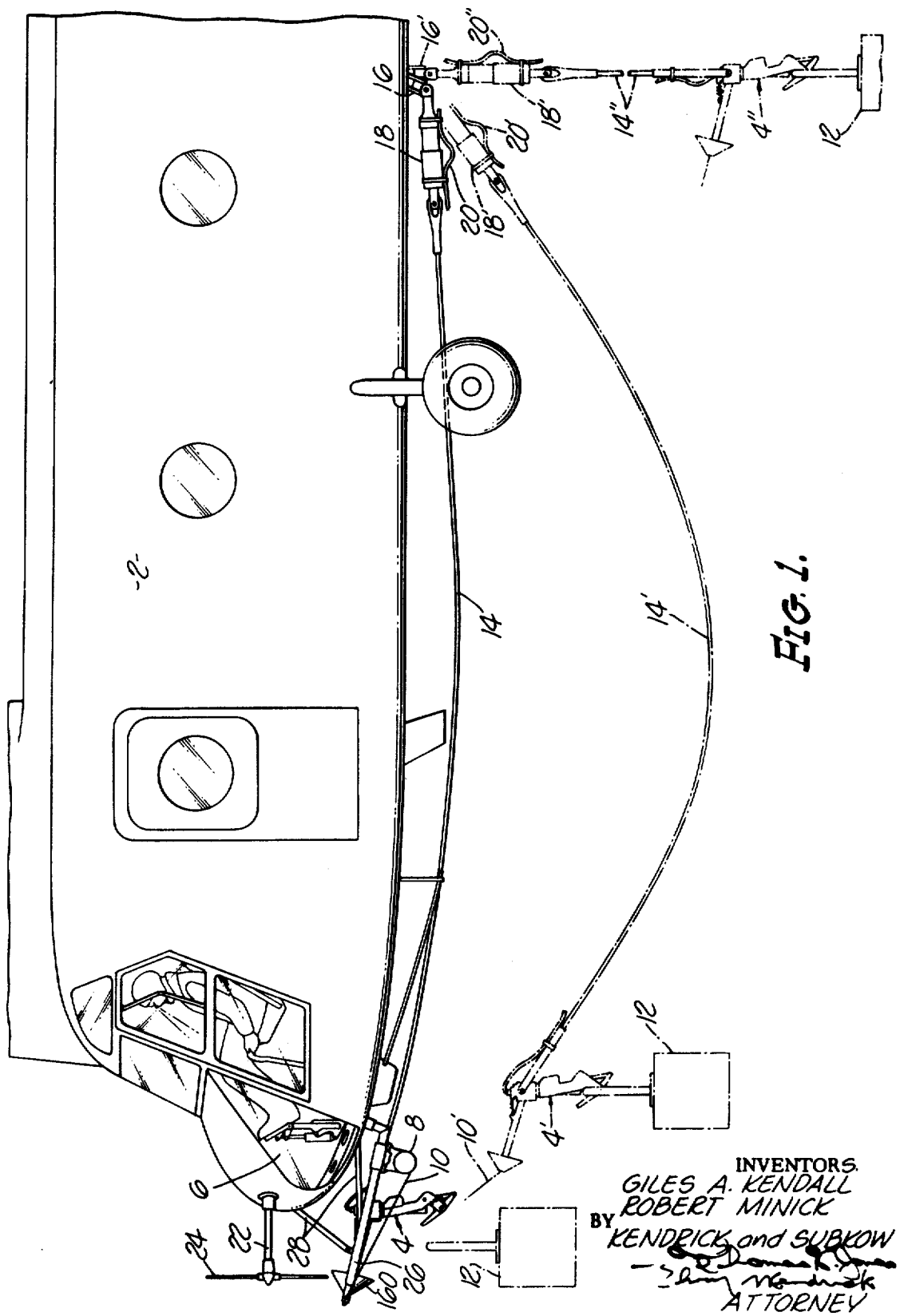
FIG. 1 is a side elevational view of a helicopter employing the present invention which illustrates the placement of the tactical cargo hook assembly in several positions with respect to the helicopter during its use.

Our tactical cargo hook system is shown in FIG. 1 which illustrates the positioning of the cargo hook assembly 4 relative to a helicopter 2 during its various stages of use. When not in use, the cargo hook assembly 4 is carried on the nose of the helicopter where it is held in place by means of a positioning cable 10, a support arm 26 and a plurality of braces 28. The hook assembly in its carried position is visible to the helicopter pilot through a transparent panel 6 in the nose of the helicopter.

There may also be affixed to the helicopter a support arm 22 which holds an upright antenna 24. A transparent panel 6 may make the cargo hook assembly 4 visible to the pilot to assist him in aiming the helicopter so as to engage the hook assembly 4 with a load 12 on the ground to be picked up by the helicopter in flight. The structural features of the helicopter 2, such as the transparent window 6, support 22, and antenna 24 are not a part of our invention and are disclosed merely to demonstrate placement of our system with respect to a helicopter.

The positioning cable 10 is connected to a reel assembly 8 which is conventional in structure and, thus, is not illustrated in detail. Reel assembly 8 comprises a reel on which the cable 10 is wound and a hydraulic motor coupled to the reel through a clutch. The hydraulic motor acting through the clutch exerts a constant torque on the reel which in turn maintains an essentially constant tension in the cable 10. If a force exerted on the cable 10 exceeds this constant tension, the cable is unwound from the reel assembly 8 to a position as shown at 10' through slipping of the clutch. Due to the constant tension maintained on the cable 10 by means of the reel assembly 8, any slack in the cable 10 is taken up so as to maintain the cable 10 in a taut condition at all times.

The clutch employed may be a multiple disc type clutch and the hydraulic motor may be a non-reversing motor having a fixed stall torque characteristic. Thus, when the torque exerted on the motor through the clutch exceeds a predetermined value, the motor stalls and acts as a brake in holding one or more plates of the clutch stationary. When the torque exerted on the motor through the clutch falls below the predetermined value, the motor is immediately actuated in taking up slack in the cable 10.

Upon engagement of the cargo hook assembly 4 with the load 12, the force exerted on the cable 10 exceeds the constant tension imparted to the cable by the reel assembly 8 and the cable 10 unwinds to a new position as shown at 10' while the hook assembly 4 releases from its carried position on the front of the helicopter and swings rearwardly to a new position, as shown at 4'. The main support for the cargo hook assembly 4 is a support cable 14 which assumes the position 14' as the hook assembly is released from the nose of the helicopter 2. Support cable 14 is connected to the helicopter at or near its center of mass through a shock absorber 18 which is in turn connected to a movable support bracket 16 affixed to the helicopter 2. A hydraulic line 20 runs along cable 14 to the cargo hook assembly 4 and is used for actuating the cargo hook in a manner to be described later. As the cable 14 assumes position 14' on release of the cargo hook assembly 4 and its movement to position 4', the shock absorber and hydraulic line 18 and 20 move to positions 18' and 20', respectively.

As the helicopter 2 continues its forward flight, the cargo hook 4 continues its rearward movement to a position 4'' at which point the support cable 14 assumes the position 14' in which it hangs downward from bracket 16 which has now assumed the position 16'. The shock absorber 18 has also moved to position 18' and the hydraulic line 20 has moved to position 20''. It should be noted that the load 12 does not move until the cargo hook assembly 4 has reached position 4'' such that it is supported entirely by the support cable 14 in its position as illustrated at 1'''. As shown in FIG. 1, it might appear that the load 12 is moving during the movement of the cargo hook assembly 4 from its carried position on the nose of the helicopter to its load bearing position 4''. However, this is not the case. In fact, the helicopter 2, which is shown as stationary in FIG. 1 for ease of illustration, is moving as the cargo hook moves from position 4 to position 4'' and this creates the illusion that the load 12 is undergoing movement.

The initial shock imparted to the helicopter as the support cable 14 becomes taut during the pick up of the load 12 is transmitted to the shock absorber 18. A suitable shock absorber is of a solid type filled with a compressible solid, as illustrated in U.S. Pat. No. 3,178,037. Any tendency for the cargo hook assembly 4 and support cable 14 to swing toward the rear of the helicopter during the pick up of the load 12 is resisted by the constant tension exerted on positioning cable 10 by the reel assembly 8. Thus, for example, if the cargo hook assembly 4 and cable 14 should oscillate in the manner of a pendulum beneath the helicopter 2, the reel assembly 8 will reel in the cable 10 if the hook assembly 4 should swing toward the nose of the helicopter to remove slack from cable 10 and maintain it in a taut condition. Similarly, if the cargo hook assembly 4 should swing toward the rear of the helicopter, this swinging movement is opposed by slipping of the clutch in reel assembly 8 to maintain a force applied to the hook assembly 4 through positioning cable 10. Thus, the positioning cable 10 and reel assembly 8 act to dampen out oscillatory movement of the hook assembly 4 and load 12 beneath the helicopter 2 while the shock absorber 18 dampens out vibration of the cargo hook assembly 4 along the axis of the cable 14.

Figure 2:
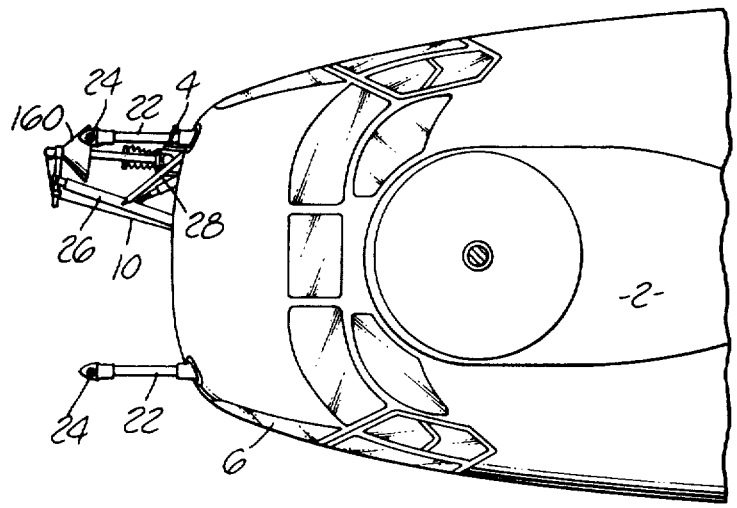
FIG. 2 is a partial top view of a helicopter showing the location of the tactical cargo hook assembly, in its carried position on the nose of the helicopter.

FIG. 2 illustrates the position of the cargo hook assembly in its carried position while in an unloaded condition on the nose of the helicopter 2. As shown, the support arm 26 and braces 28 carry the cargo hook assembly 4 in a position which is offset from the center line of the helicopter. Thus, when the cargo hook assembly 4 is released from the nose of the helicopter 2 to assume position 4'', as shown in FIG. 1, the hook assembly 4 traverses a somewhat diagonal path relative to the helicopter axis. When it reaches its load carrying position 4'', the hook is supported from the bracket 16, which is positioned along the center line of the helicopter near its center of mass. If desired, the cargo hook assembly 4 could, of course, be carried at a point on the center line of the helicopter or on its left side, as viewed from above in FIG. 2. The placement of the cargo hook assembly 4 in its carried position relative to the helicopter nose is designed to make the hook visible to the pilot or copilot who sits in the nose. Thus, the placement of the cargo hook assembly 4 in its carried position may be varied to suit the configuration of the particular helicopter, e.g., the shape of the helicopter nose portion, whether one or two people ride in the nose of the helicopter, etc.

Turning to FIG. 5, the cargo hook assembly 4 is carried by a clevis 30, which includes a cable block 32, as shown in FIG. 7. The clevis 30 is connected to a support housing 36 through trunnions 38. Support housing 36 has a central aperture through which passes a shaft 40 having an enlarged head 52. The enlarged head 52 is connected to a bearing plate 48 through any suitable means, not shown, and bears against plate 48 along an annular bearing area, as indicated at 46. Shaft 40 is rotatable with respect to housing 36. Bearings 54 are positioned between housing 36 and shaft 40 and upper and lower seals 57 to prevent leakage of lubricant. The shaft 40 is held in place by means of a locking collar 42 and a lock screw 44 which prevent vertical movement of shaft 40 with respect to housing 36.

A pair of side members 64 in spaced relation are bolted to the lower portion of shaft 40 by bolts 66, and a hook 106 is pivotally mounted between side members 64 at their lower extremity by a pivotal connector 107. As indicated at 110, the lower ends of side members 64 are inclined away from the center line of shaft 40 such that a load bar 120 supported by hook 106 fails on or near the center line of shaft 40. The hydraulic line 20 is connected through a hydraulic fitting 33 to a swivel joint 34. The lower portion of swivel joint 34 threadedly engages a central passage 56 within shaft 40. The central passage 56 is joined at its lower end through a hydraulic fitting 58 to a spring loop 60 which is connected through a suitable hydraulic fitting 62 to a hydraulic cylinder 68.

As best shown in FIG. 7, a piston 70 and a piston rod 72 are mounted within cylinder 68 such that on pressurization of the cylinder 68 with hydraulic fluid, the piston 70 and piston rod 72 move downwardly. Piston rod 72 is threadedly held by a nut 86 to an eye connector 84 which is rotatably connected to a V-shaped lever arm 88 by bolt 94. As shown, in FIG. 5, lever arm 88 has a short end 90 and a long end 92 and is mounted between side members 64 by a pivot bolt 96. On downward movement of the piston rod 72, the lever arm 88 is rotated in a counterclockwise direction from its position as shown in FIG. 5 about pivot bolt 96.

An arm 102 having an enlarged bifurcated upper end 101 is pivotally connected to the V-shaped lever arm 88 by a bolt 100, and the other end of arm 102 is rotatably connected to the bifurcated rear portion of hook 106 by bolt 104. Affixed to arm 102 are a pair of spring support studs 114, which are connected respectively to coil springs 116, the other ends of which are connected to a pair of spring support studs 112 mounted on the side members 64. With the hook 106 in its closed position, as shown in FIG. 5, when supporting a load bar 120 on its curved inner surface 118, the coil springs 116 act to maintain the hook in its closed position.

The arrangement of the V-shaped lever arm 88 and the arm 102, as shown in FIG. 5, is that of a toggle joint such that a load on the hook 106 is transmitted to arm 102 through bolt 104 and tends to move the enlarged upper end 101 of arm 102 in a counterclockwise direction from that shown in FIG. 5, thereby locking the toggle joint and maintaining the hook 106 in its closed position. The counterclockwise movement of the enlarged end 101 from its position as shown in FIG. 5 is limited by an adjustable stop nut 108, which is affixed to hook 106 and engages the enlarged end 101. In the locked position of the toggle joint, the center point of bolt 100 and enlarged end 101 lies to the left of the line 103 between the centers of bolt 96 and bolt 104.

The load bar 120 is held in place within the hook 106 in its closed position by a latch plate 122, which is connected to a spring 132. Spring 132 is carried by a spring support 128 held between side members 64 by bolts 130. The extent of movement of the latch plate 122 is limited by an arcuate slot 126 which engages a guide pin 124 carried by one of the side members 64. As shown in FIG. 5, the latch plate 122 may be depressed inwardly to permit the placement of load bar 120 on the hook 106 in its closed position. Once the load bar 120 is in place, however, it is held by the latch plate 122 such that it cannot be removed except by opening of the hook 106.

Turning again to FIG. 7, the hydraulic cylinder 68 forms an eye connector 78 at its upper end which is rotatably held between side members 64 by a bolt 80. Spacer sleeves 82 center the position of eye connector 78 and the cylinder 68 between side members 64.

The opening of hook 106 is illustrated in FIG. 6 showing the piston rod 72 in an extended position with the V-shaped lever arm 88 rotated in a counterclockwise direction. The downward movement of piston rod 72 produces a relatively large movement of the hook 106 by virtue of the ratio of the length of the short end 90 of lever arm 88 to the length of its long end 92. As the lever arm 88 undergoes counterclockwise rotation, the pivot bolt 100 moves upwardly thereby transmitting force through arm 102 and bolt 104 to the hook 106 — forcing it to move in a counterclockwise direction to an open position. As shown in FIG. 6, the coil springs 116 are then in a stretched condition which tends to return the hook 106 to its closed position. On release of the load from the hook 106, the hydraulic pressure in the cylinder 68 is reduced through means of a conventional valve control located inside the helicopter and the springs 116 return the hook to its closed position, as shown in FIG. 5. The magnitude of force transmitted by coil springs 116 in closing the hook 106 and returning piston 70 and piston rod 72 to the position shown in FIG. 7 is increased by the ratio of the length of long end 92 of lever arm 88 to its short end 90. This assists in overcoming any back pressure exerted by hydraulic fluid within cylinder 68 during the closing of hook 106.

During rotation of the hook 106 to an open position, the cylinder 68, as shown in FIG. 7, rotates about support bolt 80 through eye connector 78. During rotation of cylinder 68, stresses in the hydraulic line leading to the cylinder are taken up in the spring loop 60 which, as shown in FIG. 5, is protected by a plate 74 secured to side members 64 by mounting nuts 76.

As shown in the upper portion of FIG. 5, a cone shaped probe 136 is supported by a guide arm 134, which is connected to housing 36 by bolts 55. A central aperture 138 within probe 136 contains the positioning cable 10 which is attached through cable connector 140 and pin 142 to probe 136. Spring brackets 144 are affixed by any suitable means, such as welding, to the upper portion of guide arm 134. As shown in FIG. 8, screws 146 threadedly engaged in spring brackets 144 are connected to coil springs 148 which are in turn connected to an eccentric 150. The eccentric is mounted off center from the axis of shaft 40 and is connected to the enlarged head 52 of shaft 40 by a bolt 242. As shown in FIG. 5, the curved inner ends of springs 148 are held in holes 152 within eccentric 150.

The springs 148 function to maintain hook 106 in a frontally facing direction along the axis of guide arm 134 when the hook 106 is not supporting a load. When hook 106 is in a frontally facing direction, as shown in FIG. 8, the springs 148 are in their condition of least stress. When shaft 40 is rotated, thereby causing rotation of the eccentric 150, the springs 148 are stretched. The stretching of springs 148 imparts a turning moment to eccentric 150, which tends to rotate shaft 140 and hook 106 to a frontally facing direction.

Under many conditions, it may be desirable to rotate shaft 40 with respect to housing 36 in order to position heavy equipment so that it is facing in a particular direction when deposited on the ground. To illustrate, a gun may be supported by cargo hook assembly 4 from a helicopter 2, and it is desirable to have the gun facing in the direction in which it is to be fired when deposited on the ground. A means of accomplishing this result is to turn the gun in the desired direction by rotating the shaft 40 relative to housing 36 to position hook 106, when supporting a load so as to vary the facing direction of the hook. The facing direction of hook 106 is the direction along the axis of the hook toward its free end, i.e., away from bolt 104. Such rotation is, of course, opposed by springs 148 and if there were no friction between shaft 40 and housing 36, the shaft 40 would immediately snap back to its original position on removal of the turning force. To prevent this, a pair of annular thrust plates 50 and 51 which form a thrust bearing, as shown in FIG. 5, are placed between bearing plate 48 and housing 36. Plate 50 may be connected to bearing plate 48 while plate 51 is connected to housing 36 by any suitable means, not shown. The upper surface of plate 51 and the lower surface of plate 50, which are in mating engagement, are coated with a facing material such as teflon or bronze which has a relatively low coefficient of friction. The frictional resistance of plates 50 and 51 to relative movement is less than the force exerted by springs 148 when hook 106 is not supporting a load. In its unloaded condition the hook 106 is thus maintained in a direction facing the probe 136. When hook 106 is supporting a load, the frictional resistance between plates 50 and 51 is greater than the force exerted by springs 148 and hook 106 may, therefore, be positioned in any desired direction by rotating shaft 40 and plate 50 with respect to housing 36 and plate 51. The force required to effect this rotation is less than the tension in cable 10 acting on the housing 36 through guide arm 134. Thus, rotation of shaft 40 relative to housing 36 does not result in winding the cable 10 around the housing 36.

If desired, the direction of the hook 106 and a load supported thereby can be changed by the helicopter pilot during flight. If the helicopter 2 is rotated rapidly, the cable 10 and housing 36 will rotate with the helicopter to cause slippage between plates 50 and 51, thereby rotating shaft 40 and hook 106 with respect to housing 36.

The friction between the surfaces of plates 50 and 51 which are in frictional engagement will generally be less than the friction between plate 51 and housing 36 or plate 50 and bearing plate 48. Thus, it will not be necessary in many cases to physically connect plate 51 to housing 36 or plate 50 to bearing plate 48 since the frictional forces between these surfaces will transmit torque to prOduce slippage between the surfaces of plates 50 and 51 which are in frictional engagement.

Figure 3:
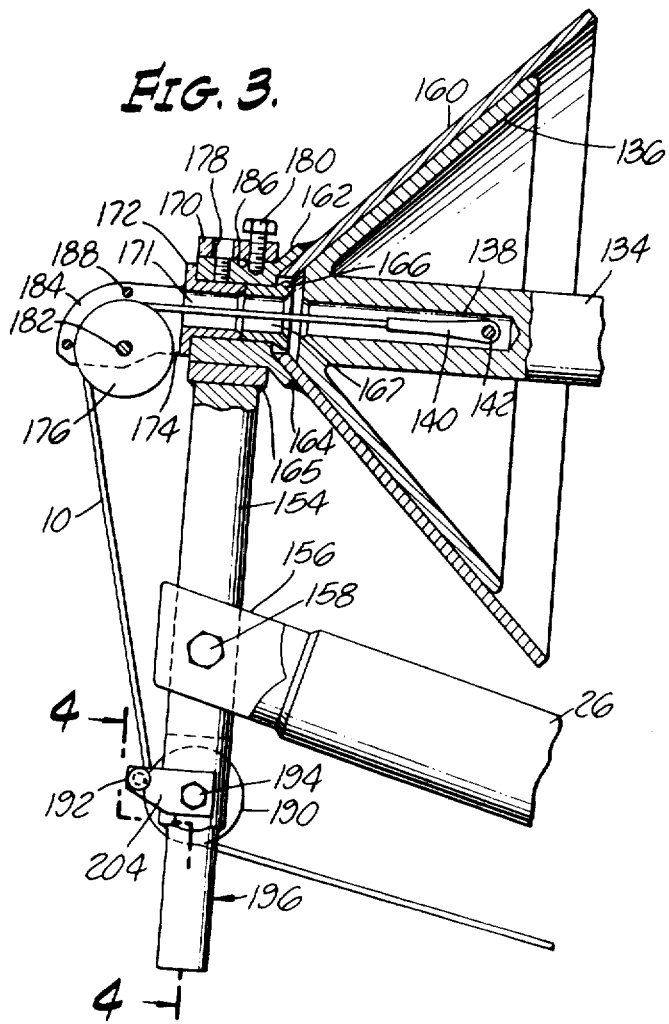
FIG. 3 is a top view in partial section showing mating engagement of the probe connected to the tactical cargo hook assembly with a corresponding drogue in the hook supporting structure.

The function of the cone-shaped probe 136 in maintaining the cargo hook assembly 4 in a fixed position on the nose of helicopter 2 when not in use is best shown in FIG. 3. The probe 136 is drawn into mating engagement with a correspondingly cone-shaped drogue 160 by positioninG cable 10 connected to probe 136. Drogue 160 is held by support arm 26 which, as described previously with respect to FIG. 1, is connected to the nose of the helicopter 2. Support arm 26 terminates in a bracket 156 which supports a cross member 154 by means of a bolt 158.

A cone sleeve 166 made of teflon or similar material is positioned at the apex of the conically shaped drogue 160. Concentrically mounted about cone sleeve 166 is a support member 162, within which the sleeve 166 may be press fitted. The support member 162 is connected to the drogue 160 by any suitable means, such as welding 164. The cone sleeve 166 provides a central aperture 167 which is of approximately the same size as the central aperture 138 within the probe 136, said apertures 167 and 138 being in aligned relation when the probe 136 and drogue 160 are in mating engagement.

A support collar 170 is affixed to the inner end of cross member 154 by any suitable means, such as welding 165. The support member 162 and drogue 160 are held to collar 170 by means of a lock screw 180 which engages a hole 186 in support member 162.

A pulley-support sleeve 172 is positioned within the support member 162 and is held in place therein by a lock screw 178 which extends through aligned holes in collar 170 and support member 162 and engages the outer peripheral surface of sleeve 172. An arm 174 is connected to pulley support sleeve 172 and a guide pulley 176 is connected by a pin 182 to arm 174. A cable guard 184 extends around the pulley 176 and is fixed to the support arm 174 by means of pins 188. The cable guard 184 maintains the cable 10 within the grooved portion of pulley 176, even under conditions when the guide cable 10 becomes temporarily slack.

A central aperture 171 which may be coated with teflon or a similar material is provided within pulley support sleeve 172, which aperture is in aligned relation with aperture 167 in cone sleeve 166 and the aperture 138 in probe 136. The apertures 171, 167 and 138 are of a suitable size to permit free movement of the cable 10 therein when the probe 136 is withdrawn from the drogue 160 under conditions when the cargo hook assembly 4 is picking up a load from the ground, as described in FIG. 1, or under conditions when the cargo hook assembly is being returned to its carried position on the nose of the helicopter 2. Moreover, the teflon surfaces of apertures 167 and 171 protect the cable 10 against wear from rubbing contact with the aperture walls.

After passing over the guide pulley 176, the cable 10 passes under a pin 192, and around a second guide pulley 190 from whence it passes to the reel assembly 8, as shown in FIG. 1. The guide pulley 190 is made integral with a guide follower assembly 196 which is connected by any suitable means to the cross member 154. Pin 192 is supported relative to pulley 190 by a support bracket 204 and a bolt 194 which serves the dual function of rotatably supporting pulley 190 with respect to the guide follower assembly 196 and also holding the support bracket 204 in a fixed position.

Figure 4:
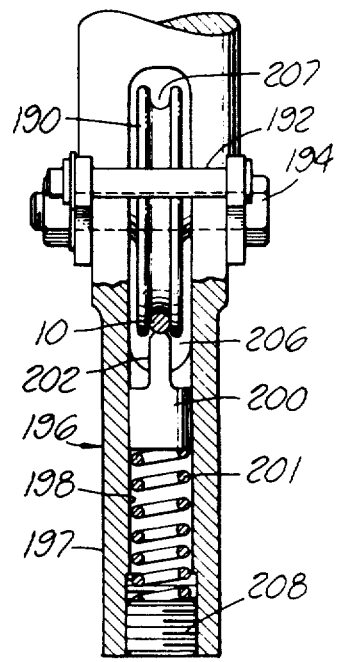
FIG. 4 is a partial sectional view taken along the lines 4—4 of FIG. 3 showing the engagement of the cable follower with the positioning cable to maintain the cable within the groove of the guide pulley and to maintain a slight braking force on the cable to keep it from unravelling.

The guide follower assembly 196 is shown in detail in FIG. 4. The guide follower assembly 196 includes a cylindrical tube 197 having a cylindrical space 198 therein. A follower 200 and a follower spring 201 are contained within the cylindrical space 198 such that the spring 201 biases the follower 200 in the direction of the pulley 190. Spring 201 is retained within space 198 by a lock screw 208 which threadedly engages tube 197.

Cable 10 passes through the tube 197 through a hole 206. The guide follower 200 contains a finger 202 which engages pulley 10 and forces it into the groove 207 within pulley 190. The finger 202 exerts a slight braking force on the cable 10 to prevent it from unravelling should the cable temporarily become slack.

A second embodiment of our invention is shown in FIGS. 10-14. The second embodiment concerns a different structure for the cargo hook assembly than that shown in FIGS. 5-8. The second embodiment of our cargo hook assembly 243 is carried on the nose of a helicopter 2, in the same manner as described in FIGS. 1, 3 and 4. However, the second embodiment of our cargo hook assembly is electrically actuated and thus the hydraulic line 20, as shown in FIG. 1, is replaced with an electrical conduit when employing the cargo hook assembly 243.

Turning to FIG. 10, a support housing 244 is supported by trunnions 342. A shaft 246 having a central aperture 258 is rotatably held within housing 244 by bearings 248 and seals 259. Shaft 246 has an enlarged head 250 which is connected to a bearing plate 252 by any suitable means, not shown. Bearing plate 252 rests on the upper surface of support housing 244 and the enlarged head 250 rests on the bearing plate 252 along an annular bearing area as indicated at 256.

A guide arm 332 carries a conical probe 334 at its outer end and is connected to support housing 244 by bolts 335. An eccentric 336 is connected to the head 250 by a bolt 337 and coil springs 338 connect eccentric 336 to studs 340 on the guide arm 332. The probe 334 is connected to the guide cable 10 which, as described previously with regard to FIGS. 1–4, passes over guide pulleys 190 and 176 to the reel assembly 8 positioned at the nose of helicopter 2.

A collar 282 is connected by any suitable means, not shown, to support housing 244, and maintains the shaft 246 along the center line of support housing 244. A pair of annular thrust plates 254 and 255 having contacting surfaces coated with teflon on a similar material are positioned between the lower surface of bearing plate 252 and the upper surface of housing 244. Thrust plate 255 is connected to bearing plate 252 and thrust plate 254 is connected to housing 244 through any suitable means not shown.

The general function of the cargo hook assembly 243, as thus far described, is the same as that of our cargo hook assembly 4 shown in FIGS. 5, 7 and 8. The coil springs 338 are in their least stressed condition when the hook 302 is facing frontally along the axis of the guide arm 332. As shaft 246 rotates with respect to housing 244, the eccentric 336 is rotated and places coil springs 338 under tension such that the springs 338 exert a turning moment on shaft 246 through eccentric 336 which tends to return the shaft 246 to its frontally facing position. The thrust plates 254 and 255 function in the same manner as the thrust plates 50 and 51 as described with respect to FIG. 5. That is to say, the thrust plates 254 and 255 cause a frictional engagement between bearing plate 252 and housing 244 such that shaft 246 can be rotated with respect to housing 244 to position a load in any desired direction before depositing the load on the ground.

Proceeding with the description of FIG. 10, a support arm 264 is connected by bolts 266 to housing 244 and at its upper end carries a clevis support 270 which is connected to support arm 264 by a nut 268. Clevis support 270, as will be described in detail in FIG. 13, supports a platform 276 which is rotatably mounted with respect to clevis support 270 on bearings 280. A solenoid 262 is connected to platform 276 by bolts 278 which pass through holes in the flanged portion 277 of solenoid 262. The bearing 280 permits a rocking movement of platforms 276 with respect to clevis support 270, thereby permitting a rocking of solenoid 262 to the position indicated in phantom at 262'.

The connection between clevis support 270 and support arm 264 permits rotational movement of clevis support 270 with respect to support arm 264. A shaft 273 formed at the inner end of the clevis support 270 engages a hole 272 in the upper portion of support arm 264. Sleeve bearings 274 are positioned between the shaft 273 and hole 272 to permit easy rotation therebetween and the inner end of shaft 273 forms a threaded stud which threadedly engages nut 268.

As described, it can be seen that the rotational movement provided between clevis support 270 and support arm 264 on the one hand and between platform 276 and clevis support 270 on the other provides a universal joint suspension for the solenoid 262. Thus, the solenoid 262 can rock freely in any direction while being supported by the platform 276.

A push rod 260 passes through a hole in platform 276 which is not shown, and is actuated by the solenoid 262. The push rod 260 passes through the central aperture 258 within shaft 246 and its lower end threadedly engages a connector 328 connected by a pin 330 to a rotatable cam 288. A pair of side members 284 are connected in spaced relation by bolts 286y to the lower portion of shaft 246. A hook 302 is rotatably mounted between side members 284 by a bolt 304.

An arm 290 is rotatably mounted at its upper end between side members 284 by a bolt 294 and its lower end is rotatably connected to a second arm 292 by a bolt 298. The second arm 292 is rotatably connected to hook 302 by a bolt 300. A pair of coil springs 306 are fastened at their inner ends to studs 308 on side members 284 and are connected at their outer ends to bolt 298.

As shown in FIG. 10, with the hook 302 in its closed position, arm 292, and arm 290 form a toggle joint. With the hook 302 in its closed position having a load bar 326 resting on it curved inner surface 324, the effect of the load is to tend to rotate the hook 302 in a counterclockwise direction from that shown in FIG. 10. This transmits a compressive force to arms 292 and 290 and causes a cam follower 296 mounted on bolt 298 to press tightly against cam 288. In the locked position of the toggle joint, the center point of bolt 298, as shown in FIG. 10, lies to the left of a line 299 drawn between the center points of bolts 294 and 300.

A U-shaped spring support plate 310 is held between side members 284 by bolts 312. A spring 314 is connected to support 310 by bolts 316, the free end of said spring engaging the underside of a latch 318, which is rotatably mounted between side members 284 by a bolt 315. An arcuate slot 320 in the side of latch 318 engages a pin 322 mounted in one of side members 284, the arcuate slot 320 controlling the extent of movement of the latch 318. As previously described, with respect to the latch 122 in FIG. 5, the latch 318 functions to lock the load bar 326 within the curved portion 324 of hook 302 when the hook 302 is in a closed position, as shown in FIG. 10.

On actuation of a conventional electrical switch, not shown, within helicopter 2, the solenoid 262 is energized to cause a momentary upward movement of push rod 260 and counterclockwise rotation of the cam 288 from its position shown in FIG. 10. Counterclockwise rotation of cam 288 brings the radially increasing surface of the cam into contact with cam follower 296, thereby moving the center point of the bolt 298 to the right of the line 299, which unlocks the toggle joint.

The toggle joint in unlocked position is shown in FIG. 11, in which arm 290 has rotated in a counterclockwise direction about bolt 294, arm 292 has rotated in a clockwise direction about bolt 298, and hook 302 has rotated in a counterclockwise direction about bolt 304. The curved inner surface 324 engages the load bar 326, such that rotation of hook 302 moves the hook away from load bar 326. On forward movement of the cargo hook from the position shown in FIG. 11, the load bar 326 will slide over the straight surface 325 of hook 302, thereby freeing the cargo hook from load bar 326. The function of the hook 302 in freeing the load bar 326 is the same as that of hook 106 in freeing load bar 120, as shown in FIGS. 4 and 5.

With the hook 302 in its open position, the coil springs 306 are extended and exert a force on bolt 298 which tends to return the cargo hook to its closed position. Thus, when hook 302 is free of load bar 326 and push rod 260 has returned cam 288 to its position, as shown in FIG. 10, the springs 306 automatically close the hook 302 and lock the toggle joint.

As illustrated, either an upward or downward movement of push rod 260 causes its lower end to move sideways due to its connection to cam 288. This causes the solenoid 262 to tilt to relieve bending stresses in pushrod 260.

Turning to FIG. 12, which is an end view in partial section taken along the lines 12—12 of FIG. 10, the trunnions 342 are carried in a clevis 344 including a cable block 350 and bolt 352. The cable block 350 is connected to the cable 14 as shown in FIG. 1. The movement of solenoid 262 about the axis of nut 268 to a tilted position is shown in phantom at 262".

Arm 290 has a hole 354 in its upper end which containS the shaft of bolt 294 and a sleeve bearing 348 encircling said shaft. Spacers 346 center the arm 290 between side member 284.

Arm 290 has a hole 358 in its lower end and a central slot 356 within which is positioned the cam follower 296. A pair of sleeve bearings 360 within hole 358 encircle the shaft of bolt 298 to provide free rotation between arm 290 and bolt 298. The inner ends of sleeve bearings 360 abut the straight side portions of cam follower 296 to hold it within slot 356.

As best shown in FIG. 14, the arm 292 has a bifurcated upper end 362 having a hole 366 therein. Sleeve bearings 364 fit within hOle 366 to provide free rotation between arm 292 and the shaft of bolt 298 contained therein. The bifurcated upper end 362 of arm 292 fits on either side of the lower end of arm 290 and provides a space 361 to accommodate the diameter of cam follower 296. Lateral movement of arm 292 relative to bolt 298 is prevented by a pair of flanges 301 which are fixedly mounted on the shaft of bolt 298 as, for example, by press fitting.

Bolt 304 engages a hole 375 in hook 302 and passes through aligned holes in side members 284 to rotatably support the hook between said side members 284. The cam 288 is contained in an axial slot 372 in hook 302 and is mounted on the shaft of bolt 304. A bearing 374 fits on the shaft of bolt 304 and provides for rotation between cam 288 and bolt 304. A pair of bearing sleeves 376 partially surround bearing 374 and fit within the hole 375.

The hook 302 has a U-shaped end 368 which provides a space for both cam 288 and the connector 328 which threadedly engages the push rod 260 as illustrated in FIG. 10. The lower end of connector 328, slotted at 378 to provide clearance for rotation of the cam 288, is rotatably connected to cam 288 by a pin 330.

The U-shaped end 368 is rotatably connnected to the lower end of arm 292 by bolt 300. The shaft of bolt 300 passes through a hole 371 in arm 292 containing a bearing 370 to provide free rotation between arm 292 and bolt 300 while the U-shaped end 368 of hook 302 fits on the sides of the lower end of arm 292.

Turning to FIG. 13, which illustrates the mounting of platform 276 with respect to clevis support 270, bearings 280 threadedly engage holes 382 in bosses 380 on clevis support 270. The inner ends of bearings 280 form conical pivots 384 which engage corresponding conical surfaces in holes within platform 276. Sleeves 386 are positioned about the shaft of bearing 280 to provide a snug fit between the holes in platform 276 and the shaft of bearing 280. Bearings 280 can be tightened so as to decrease the freedom of rotation of table 276 by increasing the depth of their threaded engagement with holes 382. As bearings 280 are threaded deeper into holes 382, the pivots 384 make tighter contact with the corresponding conical surfaces within platform 276, thereby decreasing the freedom of rotation of platform 276.

In using out tactical cargo hook system, in picking up cargo from the ground, it is very advantageous to employ the universal pick-up support shown in both its erect and collapsed positions in FIG. 9. As there shown, the load indicated at 12 is provided with a pair of bifurcated brackets 210 having slots within which fit support members 222. Holes 240 passing through both brackets 210 and support members 222 are adapted to receive pins for holding brackets 210 to support members 222. In its collapsed position, as shown in solid line drawing, the universal lifting support comprises a plurality of frame members 212, 214, 216 and 218. These frame members are connected together in a sequential end-to-end relation by pins 230, 233, and 235. Formed integrally with frame member 216 is a sighting pole support 232 which holds a sighting pole 220 in substantially vertical position when the pick-up support is in its collapsed position.

The configuration of the universal pick-up support in its collapsed position is determined by the geometry of the bifurcated ends of frame member 214. The bifurcated end of frame member 214 which is connected to frame member 212 defines a surface 234 which contacts the surface portion 231 of frame member 212 with the pick-up support in its collapsed position. This limits further movement of frame member 214 in a clockwise direction with respect to the pin 230 connecting frame member 214 to frame member 212.

Similarly, the bifurcated end of frame member 214 connected to frame member 216 defines a surface 236 which contacts a surface 237 of frame member 216 when the pick up support is in its collapsed position. This prevents any further movement of member 216 with respect to member 214.

In use, the load 12 is picked up by sliding a hook or cable beneath the straight portion of frame member 216 shown in a substantially horizontal position in FIG. 9. Since the straight portion of frame member 216 is relatively long, it provides a good target area for a helicopter pilot in picking up the load from the ground. Also, the vertical sighting pole 220 assists the helicopter pilot in sighting on the frame 216. If desired, the pole 220 can be painted with a phosphorescent coating so as to be viSible in the dark for night pick-ups.

On application of a vertical force to frame member 216, as when picked up with a hook, the universal pick up support takes the position shown in phantom line drawing in FIG. 9 in which frame members 212, 214, 216 and 218 move respectively to positions 212', 214', 216', and 218' while the hook moves upwardly to the curved portion 217 which takes the position 217'. When the frame member 216 takes the erect position 216', the sighting pole 220 swings out to the side to assume position 220'. In erect position, the curved portion 217' of frame member 216 is equidistant from the support members 222 and the load 12 is distributed between the frame members 212, 214, 216 and 218.

When a load 12 supported by the universal pick-up support is lowered to the ground, and the hook is removed from the curved portion 217, the pick-up support immediately assumes its collapsed position. A coil spring 226 is wound about the pin 227 connecting frame member 212 to support member 222. When the frame members are in erect condition, the coil spring 226 is tightly coiled and on removal of the hook or cable from the pick-up support, the spring 226 unwinds. In unwinding, the outer end of spring 226 is attached to a pin 224 in frame member 212, such that the spring rotates the frame member from its position 212' to its position shown at 212. When rotated to position 212, the surface 231 on frame member 212 encounters the bottom surface 234 in the bifurcated end of frame member 214 and the surface 237 of frame member 216 encounters the bottom surface 236 at the other bifurcated end of frame member 214.

As the pick-up support assumes its collapsed position, the frame member 218 is rotated in a clockwise direction from position 218' to position 218 by a coil spring 228 which is wound about a pin 229 connecting the bifurcated end of frame member 218 to support member 222. The spring 228 is held at one end by engagement with a top surface 241 of support member 222 and at its other end by contact with the surface 238 defined by the bottom of the bifurcated portion of frame member 218. When frame member 218 is in its erect position at 218', the spring 228 is in a coiled condition. As the load is removed from the pick-up support, the spring 228 unwinds and forces the frame member 218 to its solid line position. As this occurs, the pin 233 is moved to the right from its erect position at 233'. This causes the sighting bar 220 to take its upright position and provides the substantially horizontal target area of frame member 216.

As described in the foregoing specification, our invention provides a tactical cargo hook system which greatly facilitates the rapid movement of cargo. Using our system, it is now possible to pick up and deposit cargo with a helicopter in a fraction of the time previously required, thereby decreasing the danger to both the pilot and ground troops during these operations.

Moreover, our invention provides a cargo hook assembly which is particularly suitable for use in conjunction with our tactical cargo hook system due to its unique structural features. Also, however, our cargo hook assembly may find use in various commercial endeavors where it is necessary to pick up or deposit cargo.

As described previously, our universal pick-up support is admirably suited for use with out tactical cargo hook system. By providing a large target area for engagement of a pick-up hook, our support assists the helicopter pilot in sighting and engaging the target area while in flight.

In describing preferred embodiments of our invention, we have made reference to various structural elements using various reference numerals. It should be understood that this is for purposes of illustration only and should not be construed as limiting our invention as defined in the following claims.

We claim:

1. A cargo hook system including a drogue;
    support means for said drogue including a helicopter, said drogue being mounted on the nose of said helicopter;
    and a cargo hook assembly, said assembly comprising a hook, support means for said hook, and means for moving said hook from an open to a closed position;
    a probe supported by said cargo hook assembly;
    means for supporting said cargo hook assembly, said means being connected to said helicopter near its center of mass, and
    means for engaging said probe in said drogue and holding said cargo hook assembly in a fixed position when not in use, and for releasing said probe from said drogue when said cargo hook assembly is in use.

2. The cargo hook system of claim 1, including means for biasing said hook in a direction facing said probe, whereby said hook is directed toward the nose of said helicopter when said probe is engaged in said drogue.

3. The cargo hook system of claim 2 wherein said means for holding said probe in said drogue includes a positioning cable connected to said probe and means for maintaining said cable in a taut condition.

4. The cargo hook system of claim 2 including means for positioning said hook, when supporting a load, to vary the facing direction of said hook.

5. A cargo hook system including a drogue;
    support means for said drogue;
    and a cargo hook assembly, said assembly comprising a hook, support means for said hook, and means for moving said hook from an open to a closed position;
    a probe supported by said cargo hook assembly;
    means for supporting said cargo hook assembly,
    means for engaging said probe in said drogue and holding said cargo hook assembly in a fixed position when not in use, and for releasing said probe from said drogue when said cargo hook assembly is in use;
    means interconnecting said support means for said hook, and said probe for positively biasing said hook in a direction facing said probe;
    said support means for said drogue including a helicopter, said drogue being mounted on the nose of said helicopter, and said means for supporting said cargo hook assembly being mounted on said helicopter near its center of mass.

6. The cargo hook system of claim 5 including means for positioning said hook, when supporting a load, to vary the facing direction of said hook independently of said means interconnecting said probe and said support means for said hook for positively biasing said hook.

* * * * *